(12) United States Patent
Fung et al.

(10) Patent No.: US 6,687,689 B1
(45) Date of Patent: Feb. 3, 2004

(54) SYSTEM AND METHODS FOR DOCUMENT RETRIEVAL USING NATURAL LANGUAGE-BASED QUERIES

(75) Inventors: Pascale Fung, Clear Water Bay; Chi Shun Cheung, Yuen Long; Yi Guan, Clear Water Bay; Yongsheng Yang, Kowloon, all of (HK)

(73) Assignee: NuSuara Technologies Sdn. Bhd., Selangor (MY)

( * ) Notice: Subject to any disclaimer, the term of this patent is extended or adjusted under 35 U.S.C. 154(b) by 125 days.

(21) Appl. No.: 09/613,849

(22) Filed: Jul. 11, 2000

Related U.S. Application Data

(60) Provisional application No. 60/212,304, filed on Jun. 17, 2000, and provisional application No. 60/212,486, filed on Jun. 16, 2000.

(51) Int. Cl.[7] ............................................. G06F 17/30
(52) U.S. Cl. ................................................ 707/3; 707/6
(58) Field of Search ........................ 707/3, 1, 2, 4, 707/5, 6, 7, 10, 100, 104; 345/703

(56) References Cited

U.S. PATENT DOCUMENTS

| | | | |
|---|---|---|---|
| 5,164,900 A | 11/1992 | Bernath ........................ 715/535 |
| 5,297,039 A | 3/1994 | Kanaegami et al. ............ 707/5 |
| 5,680,511 A | 10/1997 | Baker et al. ................. 704/257 |
| 5,764,851 A | 6/1998 | Pengwu ....................... 704/242 |
| 5,822,729 A | 10/1998 | Glass .......................... 704/255 |
| 5,835,924 A | 11/1998 | Maruyama et al. ......... 715/535 |
| 5,897,616 A | 4/1999 | Kanevsky et al. ........... 704/246 |
| 5,907,841 A | * 5/1999 | Sumita et al. ................. 707/4 |
| 6,006,175 A | 12/1999 | Holzrichter ................. 704/208 |
| 6,138,116 A | * 10/2000 | Kitagawa et al. ............... 707/3 |
| 6,163,768 A | 12/2000 | Sherwood et al. .......... 704/235 |
| 6,175,828 B1 | * 1/2001 | Kuromusha et al. ........... 707/1 |
| 6,178,401 B1 | 1/2001 | Franz et al. .................. 704/255 |
| 6,182,038 B1 | 1/2001 | Balakrishnan et al. ....... 704/250 |
| 6,219,638 B1 | 4/2001 | Padmanabhan et al. ..... 704/235 |
| 6,233,547 B1 | * 5/2001 | Denber ........................ 345/703 |
| 6,260,008 B1 | 7/2001 | Sanfilippo ....................... 704/9 |
| 6,345,271 B1 | 2/2002 | Dempsey et al. .............. 707/4 |
| 6,397,259 B1 | 5/2002 | Lincke et al. ................ 709/236 |
| 6,446,041 B1 | 9/2002 | Reynar et al. ............... 704/260 |
| 6,446,064 B1 | 9/2002 | Livowsky ....................... 707/5 |
| 6,453,315 B1 | 9/2002 | Weissman et al. ............. 707/5 |
| 6,456,969 B1 | 9/2002 | Beyerlein .................... 704/234 |
| 6,502,073 B1 | 12/2002 | Guan et al. .................. 704/255 |
| 2002/0048350 A1 | 4/2002 | Phillips et al. ............. 379/88.1 |
| 2002/0082829 A1 | 6/2002 | Jiang et al. ................. 704/226 |

\* cited by examiner

Primary Examiner—Sanjiv Shah
(74) Attorney, Agent, or Firm—Kevin A. Oliver; Foley Hoag LLP

(57) ABSTRACT

A system and associated methods identify documents relevant to an inputted natural-language user query. One associate method includes: selecting a set of keywords from the user query; determining at least one word, not necessarily found in the user query, that is semantically similar to a keyword of the set of keywords; using the set of keywords and the at least one word to determining a subset of word sets from a database of pre-stored word sets, wherein the pre-stored word sets are each pre-associated with at least one document; determining a plurality of word sets, from the subset of word sets, that is most semantically similar to the user query; and identifying documents that have been pre-associated with the plurality of word sets as being relevant to the natural-language user query.

2 Claims, 7 Drawing Sheets

SYSTEM AND METHODS FOR DOCUMENT RETRIEVAL USING NATURAL LANGUAGE-BASED QUERIES

RELATED APPLICATIONS

The present application is related to, and claims the benefit of priority from, the following commonly-owned U.S. provisional patent application(s), the disclosures of which are hereby incorporated by reference in their entirety, including any incorporations-by-reference, appendices, or attachments thereof, for all purposes:

Ser. No. 60/212,304, filed on Jun. 17, 2000, and entitled SYSTEM AND METHODS FOR INFORMATION RETRIEVAL USING SPEECH—AND NATURAL LANGUAGE-BASED QUERIES; and Ser. No. 60/212,486, filed on Jun. 16, 2000, and entitled SYSTEM AND METHODS FOR INFORMATION RETRIEVAL USING SPEECH—AND NATURAL LANGUAGE-BASED QUERIES The present application is related to the following commonly-owned U.S. patent application(s), the disclosures of which are hereby incorporated by reference in their entirety, including any incorporations-by-reference, appendices, or attachments thereof, for all purposes:

Ser. No. 09/614,465, filed on <the same day as the present application>, and entitled SYSTEM AND METHODS FOR DETERMINING SEMANTIC SIMILARITY OF SENTENCES Ser. No. 60/212484, filed on <the same day as the present application>, and entitled SYSTEM AND METHODS FOR ACCEPTING USER INPUT IN A DISTRIBUTED ENVIRONMENT IN A SCALABLE MANNER; and Ser. No. 09/614,050, filed on <the same day as the present application>, and entitled SYSTEM AND METHODS FOR FACILITATING MANUAL ENTRY OF, AND USE OF, IDEOGRAPHIC TEXT IN A COMPUTER.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to information retrieval. More especially, the present invention relates to document retrieval using the Chinese language, or like languages. Even more especially, the present invention relates to document retrieval involving remote servers on a communication network, for example, World Wide Web sites on the Internet.

The World Wide Web (the Web) is a mine of information. Unfortunately, it is frequently not easy to find needed information from the Web. The problem is not that the Web does not have the needed information. Rather, the problem is that the Web has too much information that is not needed. Various online search engines attempt to help users find just the information that is most needed by the user, based on queries supplied by user. Most of these search engines require their users to learn and use particular query syntaxes, perhaps syntaxes that require keywords combined by boolean operators. Learning and mastering such syntaxes is inconvenient for the users. More recently, some search engines have begun to allow users to enter English-language queries in the form of natural-language sentences. Nevertheless, there is still much room for improvement.

In particular, although some search engines now allow users to enter queries in the form of natural-language sentences, there is still a need to improve such systems so that they process queries to produce only the most relevant documents. Further, there is a need for systems and methods that allow users to search for documents using natural language sentences that include words of the Chinese language, or similar languages. Still further, such improved systems and methods should still be efficient and suitable for large-scale, real-time use on the Internet or on other communication networks. The present invention satisfies these and other needs.

SUMMARY OF THE INVENTION

A system and associated methods identify documents relevant to an inputted natural-language user query. According to one aspect of the invention, relevant documents are identified by: selecting a set of keywords from the user query; determining at least one word, not necessarily found in the user query, that is semantically similar to a keyword of the set of keywords; using the set of keywords and the at least one word to determining a subset of word sets from a database of pre-stored word sets, wherein the pre-stored word sets are each preassociated with at least one document; determining a plurality of word sets, from the subset of word sets, that is most semantically similar to the user query; and identifying documents that have been pre-associated with the plurality of word sets as being relevant to the natural-language user query.

According to another aspect of the invention, a system identifies relevant documents. The system includes means for selecting a set of keywords from the user query; means for determining at least one word, not necessarily found in the user query, that is semantically similar to a keyword of the set of keywords; means for using the set of keywords and the at least one word to determining a subset of word sets from a database of pre-stored word sets, wherein the pre-stored word sets are each pre-associated with at least one document; means for determining a plurality of word sets, from the subset of word sets, that is most semantically similar to the user query; and means for identifying documents that have been pre-associated with the plurality of word sets as being relevant to the natural-language user query.

DETAILED DESCRIPTION OF A PREFERRED EMBODIMENT

The following description will focus on the currently-preferred embodiment of the present invention, which is operative in an environment typically including desktop computers, server computers, and portable computing devices that are occasionally or permanently connected to one another. The currently-preferred embodiment of the present invention may be implemented in an application operating in an Internet-connected environment and running under an operating system, such as the Linux operating system, on an IBM-compatible Personal Computer (PC) configured as an Internet server or client. The present invention, however, is not limited to any particular environment, device, or application. Instead, those skilled in the art will find that the present invention may be advantageously applied to other environments or applications. For example, the present invention may be advantageously embodied on a variety of different platforms, including Microsoft® Windows, Apple Macintosh, EPOC, BeOS, Solaris, UNIX, NextStep, and the like. Therefore, the description of the exemplary embodiments which follows is for the purpose of illustration and not limitation.

I. Computer-based Implementation

A. Basic System Hardware (e.g., for Server or Desktop Computers)

Figure 1:
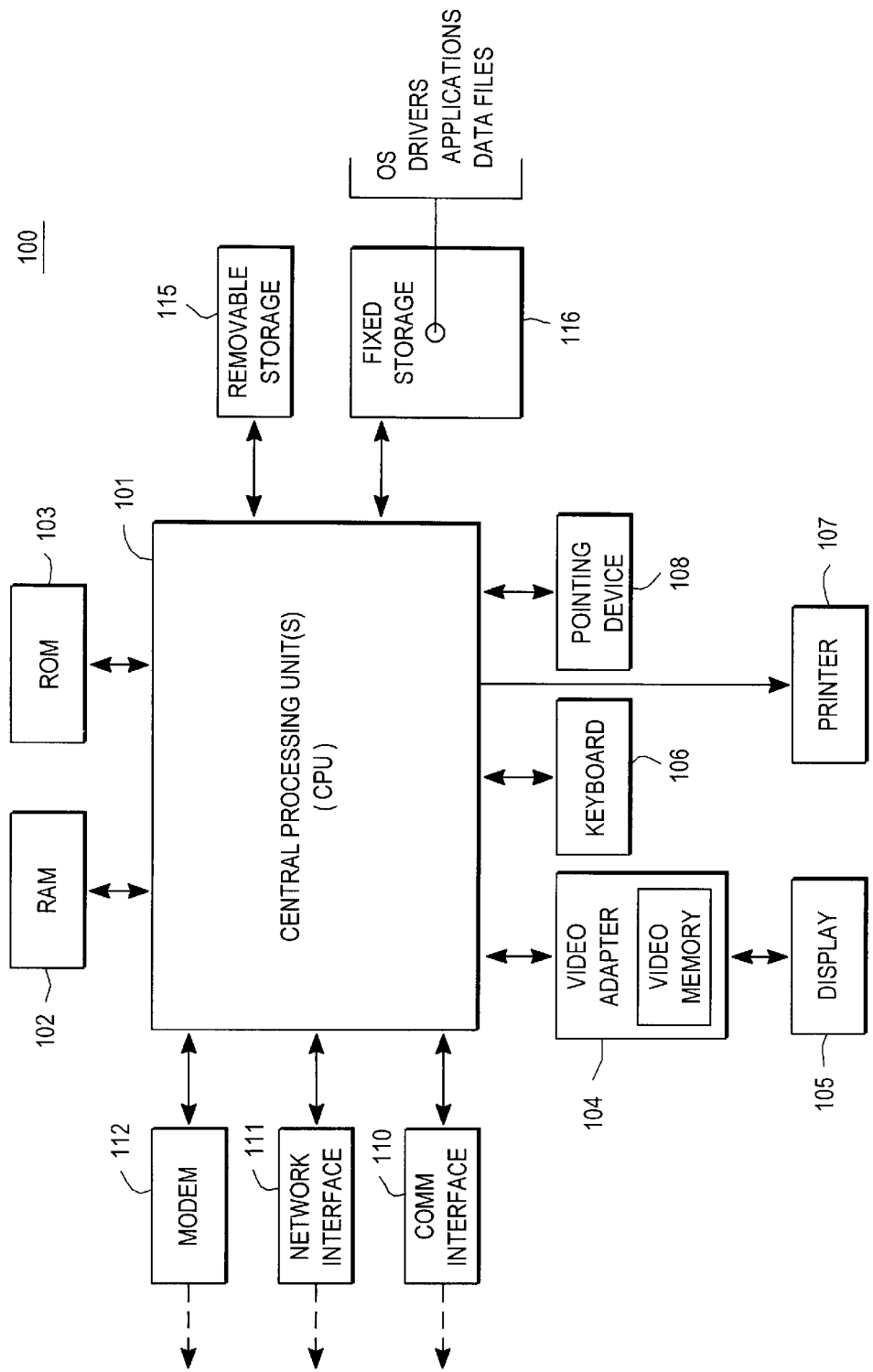
FIG. 1 is a block diagram that depicts a conventional or general-purpose computer system, such as an IBM-compatible personal computer (PC) or server computer or other similar platform, that may be used for implementing the present invention.

The present invention may be implemented on a conventional or general-purpose computer system, such as an IBM-compatible personal computer (PC) configured to be a client or a server computer. FIG. 1 is a general block diagram of an IBM-compatible system 100. As shown, system 100 comprises a central processor unit(s) (CPU) 101 coupled to a random-access memory (RAM) 102, a read-only memory (ROM) 103, a keyboard 106, a pointing device 108, a display or video adapter 104 connected to a display device 105 (e.g., cathode-ray tube, liquidcrystal display, and/or the like), a removable (mass) storage device 115 (e.g., floppy disk and/or the like), a fixed (mass) storage device 116 (e.g., hard disk and/or the like), a communication port(s) or interface(s) 110, a modem 112, and a network interface card (NIC) or controller 111 (e.g., Ethernet and/or the like). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, California. Random-access memory (RAM) 102 serves as the working memory for the CPU 101. In a typical configuration, RAM of sixteen megabytes or more is employed. More or less memory may be used without departing from the scope of the present invention. The read-only memory (ROM) 103 contains the basic input output system code (BIOS)—a set of low-level routines in the ROM 103 that application programs and the operating systems can use to interact with the hardware, including reading characters from the keyboard, outputting characters to printers, and so forth.

Mass storage devices 115 and 116 provide persistent storage on fixed and removable media, such as magnetic, optical or magnetic-optical storage systems, or flash memory, or any other available mass storage technology. The mass storage may be shared on a network, or it may be a dedicated mass storage. As shown in FIG. 1, fixed storage 116 stores a body of programs and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 115 and 116 into the main memory (RAM) 102, for execution by the CPU 101. During operation of the program logic, the system 100 accepts, as necessary, user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display device 105. Likewise, the pointing device 108, such as a mouse, track ball, pen device, or the like, permits selection and manipulation of objects on the display device 105. In this manner, these input devices support manual user input for any process running on the computer system 100.

The computer system 100 displays text and/or graphic images and other data on the display device 105. The display device 105 is driven by the video adapter 104, which is interposed between the display 105 and the system. The video adapter 104, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the computer system 100, may be obtained from the printer 107, or other output device. Printer 107 may include, for instance, a Laserjet® printer (available from Hewlett-Packard of Palo Alto, California), for creating hard copy images of output of the system.

The system itself communicates with other devices (e.g., other computers) via the network interface card (NIC) 111 connected to a network (e.g., Ethernet network), and/or modem 112 (e.g., 56 K baud, ISDN, DSL, or cable modem), examples of which are available from 3 Com of Santa Clara, Calif. The system 100 may also communicate with local occasionally-connected devices (e.g., serial cable-linked devices) via the communication interface 110, which may include a RS-232 serial port, a serial IEEE 1394 (formerly, "firewire") interface, a Universal Serial Bus (USB) interface, or the like. Devices that will be commonly connected locally to the communication interface 110 include laptop computers, handheld organizers, digital cameras, and the like.

The above-described computer system 100 is presented for purposes of illustrating the basic hardware underlying client and server computer components that may be employed in the system of the present invention. For purposes of discussion, the following description may present examples in which it will be assumed that there exists a client machine (e.g., desktop PC) having application software locally that, in turn, is connected to a "server" or remote device for providing services or information of interest to the ultimate end-user. The present invention however, is not limited to any particular environment or device configuration. For example, a client/server distinction is used to provide a framework for discussion, but is neither necessary to the invention nor even necessarily desirable. Instead, the present invention may be implemented in any type of computer system or processing environment capable of supporting the methodologies of the present invention presented in detail below.

B. Basic System Software

Figure 2:
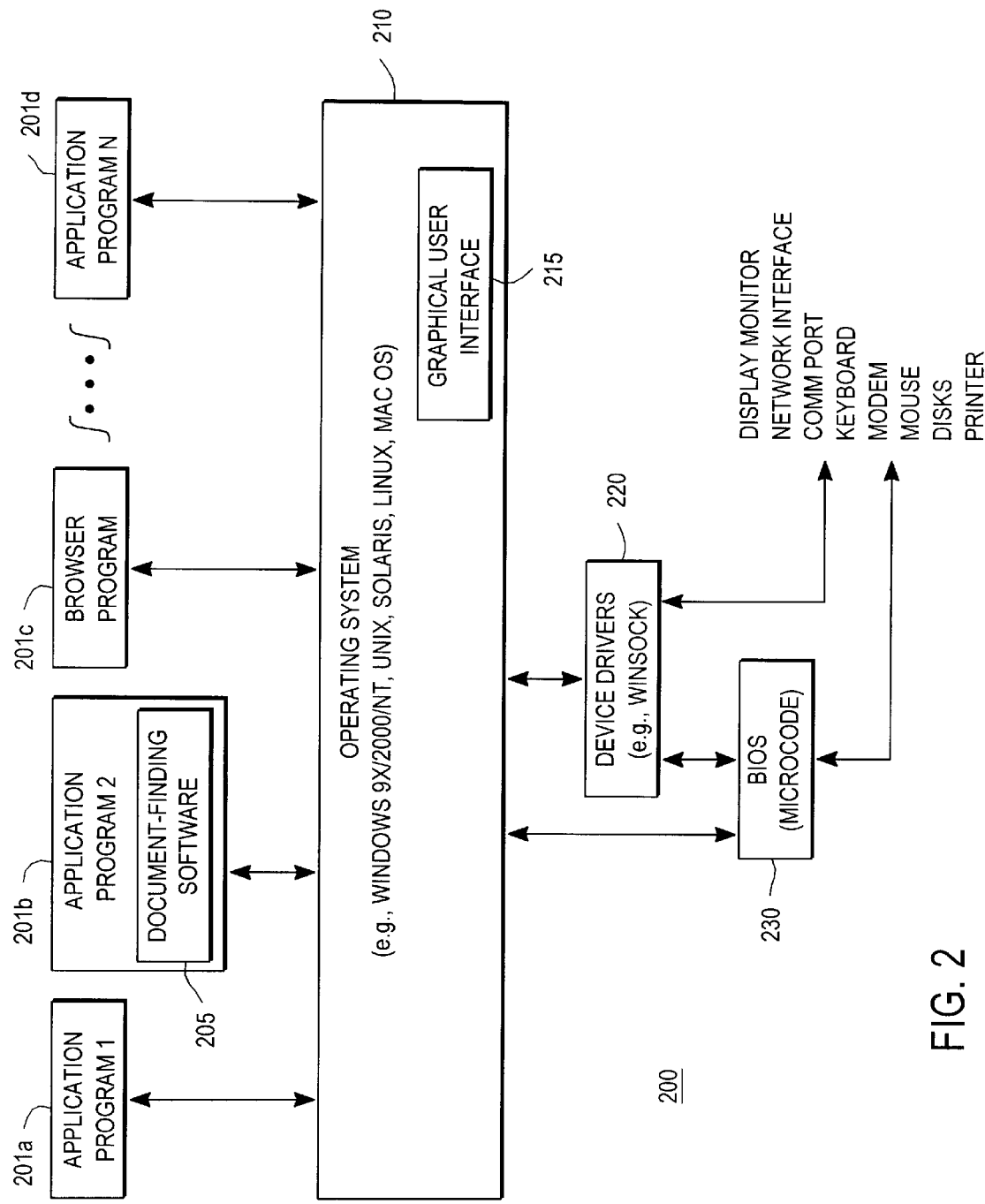
FIG. 2 is a block diagram that depicts a software system for controlling the computer system of FIG. 1.

Illustrated in FIG. 2, a computer software system 200 is provided for directing the operation of the computer system 100. The software system 200, which is stored in the main memory (RAM) 102 and on the fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client or server application software or "programs" 201 (e.g., 201a, 201b, 201c, 201d) may be "loaded" (i.e., transferred from the fixed storage 116 into the main memory 102) for execution by the computer system 100.

The software system 200 preferably includes a graphical user interface (GUI) 215, for receiving user commands and data in a graphical (e.g., "point-and-click") fashion. These inputs, in turn, may be acted upon by the computer system 100 in accordance with instructions from the operating system 210, and/or client application programs 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver) and the system BIOS microcode 230 (i.e., ROM-based microcode), particularly when interfacing with peripheral devices. The OS 210 can be provided by a conventional operating system, such as Microsoft® Windows 9x, Microsoft® Windows NT, or Microsoft® Windows 2000, all of which are available from Microsoft Corporation of Redmond, Wash., U.S.A. Alternatively, OS 210 can also be another conventional operating system, such as Macintosh OS (available from Apple Computers of Cupertino, Calif., U.S.A.) or a Unix operating system, such as Red Hat Linux (available from Red Hat, Inc. of Durham, N.C., U.S.A.).

Of particular interest, the application program 201b of the software system 200 includes document finding software 205 according to the present invention. Construction and operation of embodiments of embodiments of the present invention, including supporting methodologies, will now be described in fuirther detail.

II. Overview of The Document Retrieval System

A. Introduction

Figure 3A:
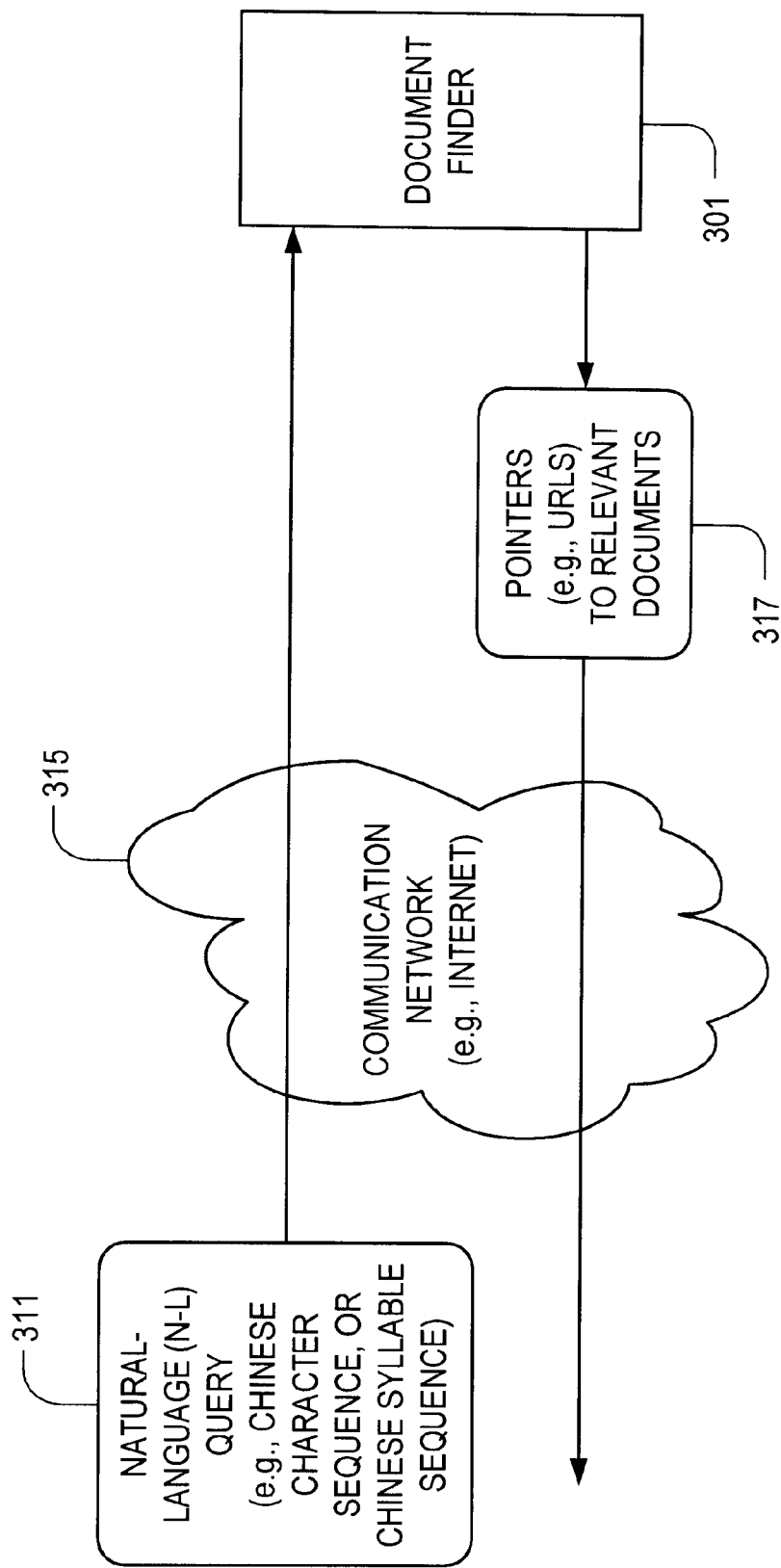
FIG. 3A is a block diagram that shows a document finding system according to the present invention.

FIG. 3A is a block diagram that shows a document finding system 301 (document finder 301) according to the present invention in its operating environment. The document finder 301 is configured to accept a user query 311 via a communication network 315, and to produce pointers 317 to documents that are (hopefully) relevant to the user query 311. The user query 311 is preferably a natural language (N-L) user query, preferably one that is at least partially in the Chinese language, or a similar language, for example, another ideographic language. The pointers 317 to documents are preferably uniform resource locators (URLs) to documents that are available on the Internet, but may be any type of designation of any document or information available anywhere. For example, the pointers 317 may be any document that is accessible via any communication network using any communication protocol. Examples of communication protocols that may be used include, but are not limited to, HTTP (Hyper-Text Transport Protocol), WAP (Wireless Application Protocol), TCP/IP (Transmission Control Protocol/Internet Protocol), other protocols suitable for underlying markup languages such as HTML (Hyper-Text Markup Language), WML (Wireless Markup Language), XML (eXtensible Markup Language), and like protocols.

The communication network 315 may include, for example, public or private networks, including local area networks, wide area networks, the Internet, the public telephone network, wireless telephone, messaging, or data networks including networks that use or enable CDMA (Code Division Multiple access), TDMA (Time Division Multiple Access), CDPD (Cellular Digital Packet Data), GSM (Global System for Mobile Communication), PHS (Personal Handyphone System), SMS (Short Message Service), FLEX™, reFLEX™, and InFLEXion™ messaging, and the like, and like networks. (FLEX, reFLEX, and InFLEXion are trademarks of Motorola, Inc., of Schaumburg, Ill., U.S.A.)

B. Multiple User-input Types: (Chinese) Syllables or Characters, Typed or Spoken The user query 311 is preferably an indication of a sequence of words, including Chinese words. The document finder 301 is preferably configured to accept, as the user query 311, a sequence of Chinese characters or, alternatively, a sequence of Chinese syllables (or a lattice of Chinese syllables that corresponds to multiple alternative syllable sequences). Chinese characters may be encoded, for example, using a standard encoding scheme such as the wellknown GB or Big5 standards. Chinese syllables may be encoded, for example, using the pinyin system that is standard in China.

Preferably, the syllable sequence or character sequence is the product of a userinput system as described in the following commonly-owned, incorporated-by-reference U.S. patent applications: Ser. No. 60/212,484, entitled SYSTEM AND METHODS FOR ACCEPTING USER INPUT IN A DISTRIBUTED ENVIRONMENT IN A SCALABLE MANNER["CHAN ET AL. 2000"]; and Ser. No. 09/614,050, entitled SYSTEM AND METHODS FOR FACILITATING MANUAL ENTRY OF, AND USE OF, IDEOGRAPHIC TEXT IN A COMPUTER["TANG ET AL. 2000"].

As described in CHAN ET AL. 2000 and TANG ET AL. 2000, a character sequence may be the product of processing spoken or typed user input. A syllable sequence may be raw typed input from the user. A syllable sequence (or a syllable lattice) may alternatively be the product of processing (i.e., recognizing) spoken user input into its syllable sequence (or into a syllable lattice).

It may be helpful to review some characteristics of the Chinese language. In Chinese, a word is formed by combining one, or typically more than one, ideographic Chinese characters. There are many more commonly-used Chinese characters (thousands) than the mere 26 characters (letters) of the English language's alphabet. From the commonly used Chinese characters, tens of thousands of commonly used words may be formed. Most Chinese characters, in written form, are more graphically complex than English letters. In spoken form, each Chinese character encompasses one syllable. (Therefore, each syllable is a character pronunciation). The mandarin dialect (China's national dialect) of spoken Chinese includes only hundreds of distinct syllables (character pronunciations). Most of these syllables may be pronounced with up to a few different intonations. Many mutually distinct characters are pronounced identically (i.e., are homophones). If pronunciations that differ only in tone are nevertheless considered to be identical, then the number of homophones for each typical syllable is even higher. Some characters can each have more than one pronunciation; the particular pronunciation to use for such a character depends on the particular word in which the character appears when the character is pronounced.

B. The System Includes a Syllable-, Character-, and/or Word-Input System

Figure 3B:
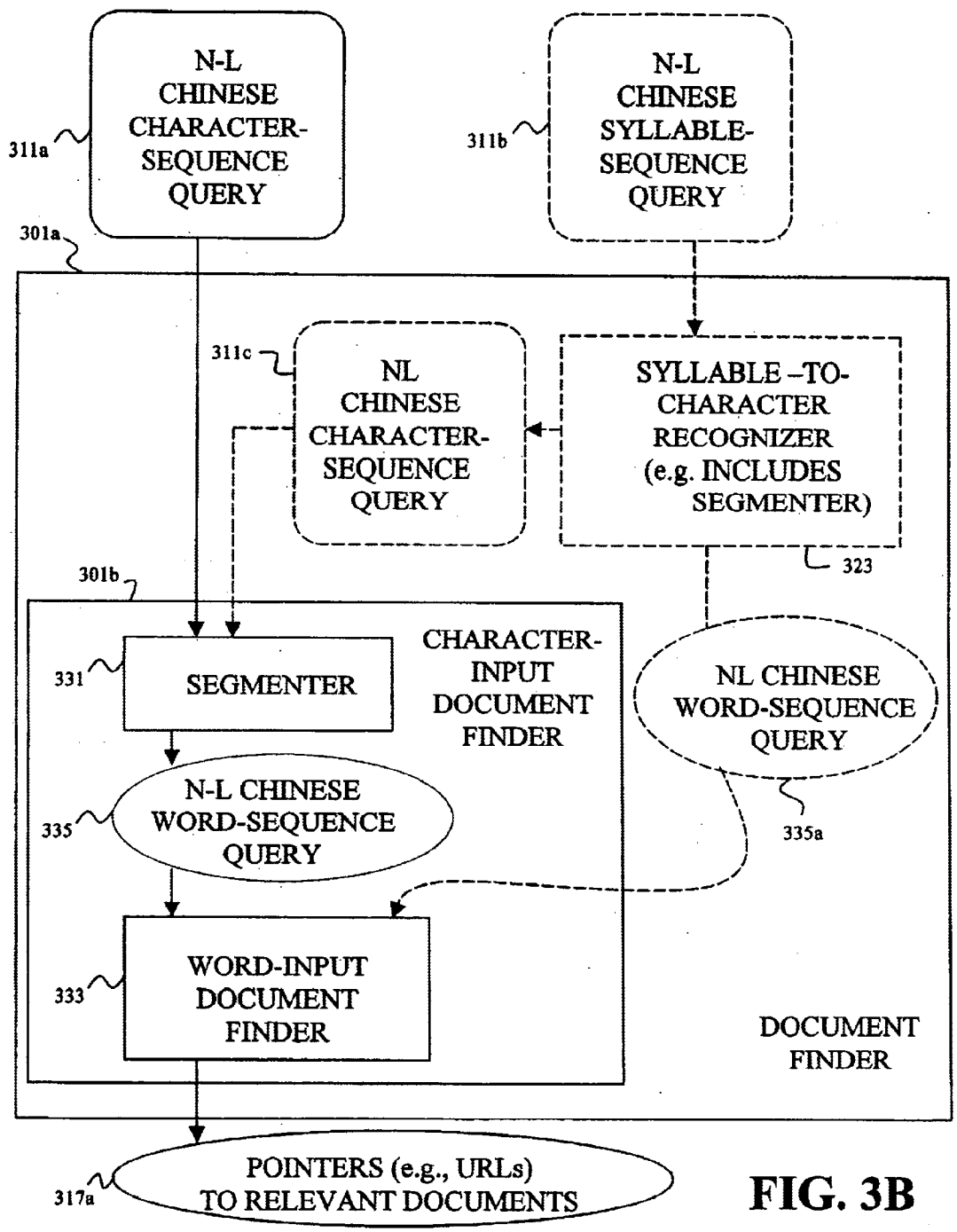
FIG. 3B is a block diagram that shows details of a preferred embodiment of the document finding system of FIG. 3A

FIG. 3B is a block diagram that shows details of a preferred embodiment 301a of the document finder 301 of FIG. 3A. As shown, the document finder 301a of FIG. 3B can receive either a character-sequence user query 311a or a syllable-sequence user query 311b. The document fmder 301a includes a syllable-to-character recognizer 323 and a character-input document finder 301b. The syllable-to-character recognizer 323 converts a syllable sequence or a syllable lattice into a most-likely character sequence, based on language information (for example, including a lexicon and a language model) that is stored locally with respect to the document finder 301a. The syllable-to-character recognizer may be embodied, for example, using the "character entry system" that is described in TANG ET AL. 2000 or using the "subwords-to-words recognizer" (preferred) that is described in CHAN ET AL. 2000.

In operation, if the document fmder 301a determines that its input 311 of FIG. 3A is a syllable sequence or a syllable lattice (based on header information in the input 311), then the document finder 301a employs the syllable-to-character recognizer 323 to convert the input 311 of FIG. 3A (i.e., the input 311b of FIG. 3B) into a character-sequence user query 311c. Once a character-sequence user query 311a or 311c exists, it is passed into the character-input document fmder 301b for further processing.

The character-input document finder 301b includes a segmenter 331 and a wordinput document finder 333 (WIDF 333). The seginenter 331 is a character-to-word converter that groups the characters within the character-sequence user query 311b (or 311c) into words that form a sequence of words. The sequence of words is a word-sequence user query 335. (The segmenter 331 is called the "segmenter" because each word that it produces is a one-or-more-character-long segment of the character-sequence user query 311b or 311c.) The WIDF 333 performs the remainder of the document finder 301a's processing by identifying documents that are most relevant to the word-sequence user query 335. The WIDF 333 outputs the identities 317a of these documents. The identities 317a are also referred to as the pointers 317a to the identified documents.

The segmenter 331 operates upon its input character-sequence user query 311b (or 311c) based on language information (for example, including a lexicon and a language model) that is stored locally with respect to the document finder 301a. The sequence of words is preferably a sequence of word IDs (identifiers, preferably integers) of the words according to the word lexicon of the document finder 301a. Note that the syllable-to-character recognizer 323 preferably uses the same lexicon as the remainder of the document fmder 301a and preferably inherently includes the functionality of the segmenter 331. Thus, if the syllable-to-character recognizer 323 is used, it can directly produce a word-sequence user query 335a that can be used, instead of the word-sequence user query 335, by the WIDF 333.

The segmenter 331 may be embodied, for example, using the segmenter that is described in TANG ET AL. 2000. The segmenter 331 may also be, and preferably is, embodied by using the "subwords-to-words recognizer" that is described in CHAN ET AL. 2000, modified so that instead of matching one-or-more syllables to each word, the modified subwords-to-words recognizer matches one-or-more characters to each word. The modification is a straightforward conversion/replacement of the word lexicon of CHAN ET AL. 2000 from a syllable-based lexicon into/by a corresponding character-based lexicon.

III. Methodology for Document Retrieval Using Chinese Natural-language Oueries

A. First, Segment the User Query into Words

Figure 4:
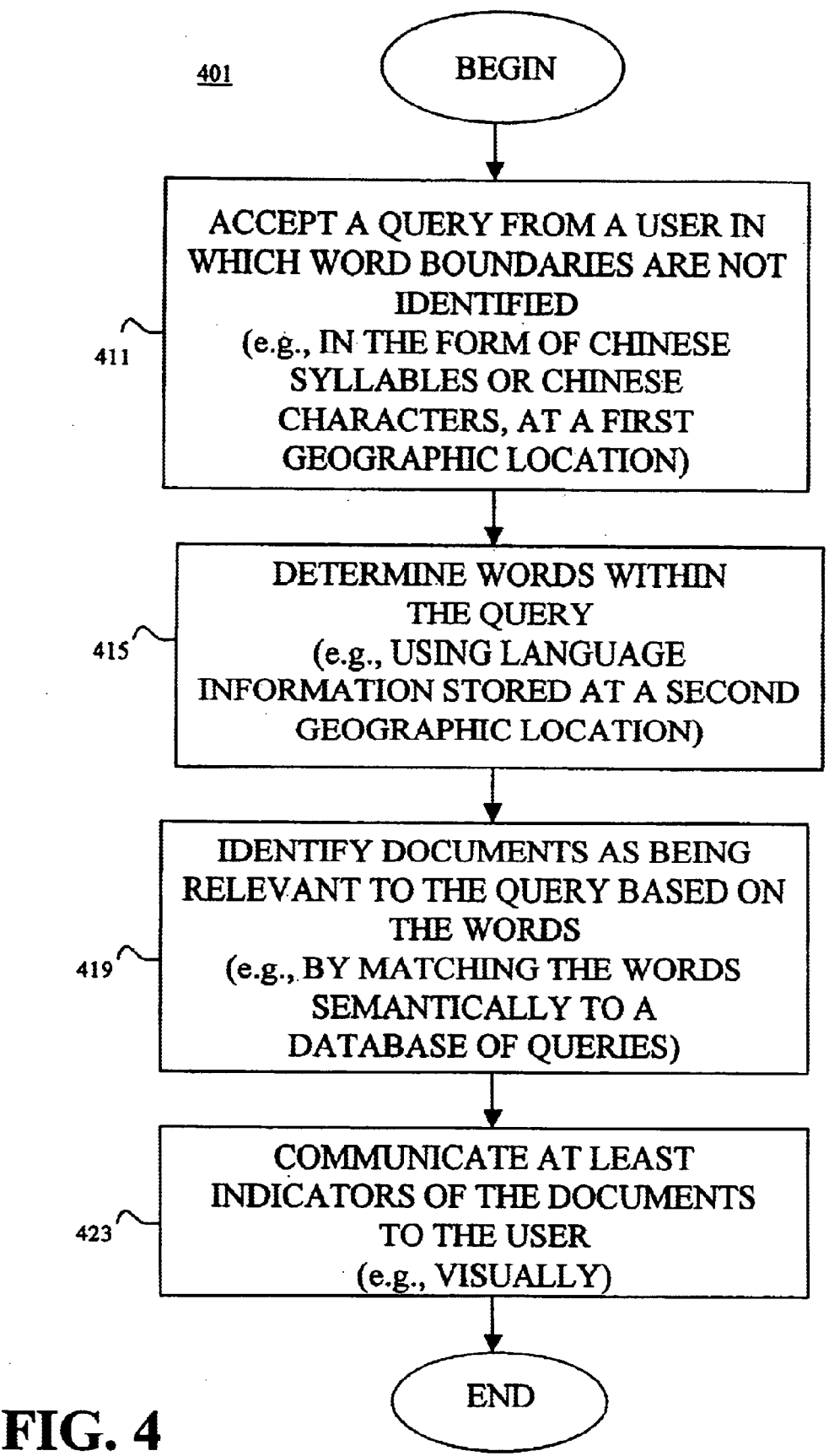
FIG. 4 is a flowchart that shows a method, according to the present invention, for retrieving documents in response to a natural-language query that includes Chinese characters.

FIG. 4 is a flowchart that shows a method 401, according to the present invention, for retrieving documents in response to a natural-language query that includes Chinese characters. In a step 411, the document finder 301 of FIG. 3A accepts a query in which word boundaries are not identified. Preferably, the query includes Chinese characters or syllables that were entered by a user at a first geographic location. Next, in a step 415, the document finder 301 determines words within the query. Preferably, in determining the words, the document finder 301 uses language information (for example, including a lexicon and a language model) that is stored at a second geographic location, and that is local with respect to the document finder 301. Preferably, the first geographic location is more than one kilometer, or more than ten kilometers, or more than one hundred kilometers or more than one thousand kilometers away from the second geographic location.

B. Next, Semantically-Match the Word-sequence User Query to Pre-stored Queries

Next, in a step 419, the document fmder 301 identifies documents as being relevant to the user query based on at least some of the words determined in the step 415. Preferably, the document finder 301 matches the determined words to pre-stored queries in a query database to identify some number K, for example, ten, of pre-stored queries in the query database that are most semantically similar to the user query. These identified queries are the "most-similar queries". Each pre-stored query is preferably an N-L query, as is the preferred user query 311. Each pre-stored query is preferably pre-associated in the query database with certain document(s). The document finder 301 identifies, as being most relevant to the user query, the documents that have been pre-associated with the most-similar queries. Next, in a step 423, the document finder 301 communicates pointers to the documents to the user, for example, visually on an HTML "search results" page (Web page). A pointer to a document may be the document itself or any reference to the document, for example, a URL to a document on the Internet.

IV. Further Details of the Document Retrieval System

A. A Semantic-similarity Matcher Matches User Queries to Pre-stored Queries

Figure 5:
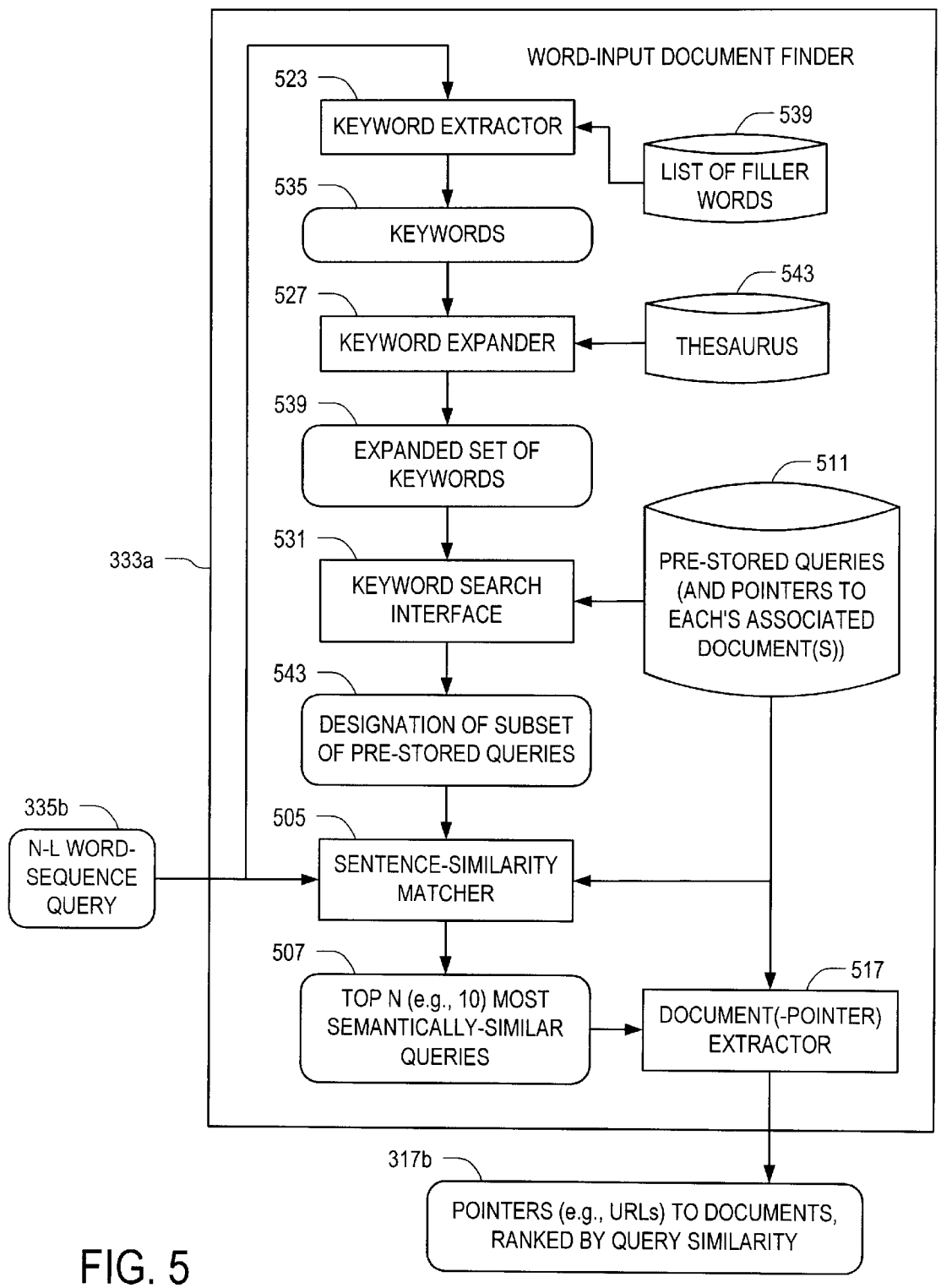
FIG. 5 is a block diagram that shows details of a preferred embodiment of the word-input document fmder within FIG. 3B.

FIG. 5 is a block diagram that shows details of a preferred embodiment 333a (WIDF 333a) of the WIDF 333 of FIG. 3B. As shown in FIG. 5, the WIDF 333a accepts as input an N-L word-sequence query 335b. The WIDF 333a includes a sentence-similarity matcher 505 that determines, and returns indicators of, pre-stored queries 507 that are most semantically similar to the user query 335b. The pre-stored queries 507 are from a database 511 of pre-stored queries and are preferably the ten (or any number K) most-relevant queries from the query database 511. Each pre-stored query in the query database 511 is associated (preferably, preassociated) with at least one document. The WIDF 333a includes a document extractor 517, which can also be referred to as the document-pointer extractor 517. The document extractor 517 identifies the documents that are pre-associated with the most-relevant queries 507. The document extractor 517 formnats the identities of these documents, as necessary, and outputs the formatted identities 317b of the documents, preferably in the form of pointers (e.g., URLs).

B. A Query Pre-screener First Reduces the Number of Pre-stored Queries to Try

The WIDF 333a further includes a keyword extractor 523, a keyword expander 527, and a keyword search interface 531. These modules together form a query pre-screener that determine a subset of the queries (called database queries) of the query database 511 for consideration by the sentence-similarity matcher 505. By determining the subset, these modules exclude, from further processing, the remainder of the queries of the query database 511—i.e., the great majority of the query database's queries that are not included in the subset. By greatly winnowing down the number of pre-stored queries to consider, these modules prevent the sentence-similarity matcher 505 from having to meticulously evaluate semantic similarity of the user query 335b with every single pre-stored query in the query database. This winnowing step is significant because the query database 511 is preferably very large, for example, with preferably over a million pre-stored queries, and preferably grows larger all the time as more queries are added to it. Therefore, because the preferred query pre-screener is much faster than the preferred semantic sentence-similarity matcher 505, the winnowing step is useful.

C. Further Details of the Semantic-similarity Matcher

Preferably, the sentence-similarity matcher 505 is embodied by the "semantic sentence-matcher" that is further described in the commonly-owned, incorporated-by-reference U.S. patent application Ser. No. 09/614,465, entitled SYSTEM AND METHODS FOR DETERMINING SEMANTIC SIMILARITY OF SENTENCES["GUAN ET AL. 2000"]. Preferably, the sentence-similarity matcher 505 matches entire queries, with possible contribution to the match from each and every word of the user query.

D. Further Details of the Query Pre-screener

1. The Keyword Extractor

The keyword extractor 523 accepts the word sequence 335b and extracts from it a set 535 of keywords. Preferably, the keyword extractor 523 extracts only the best N keywords (preferably, N equals four) from among the words of the word sequence 335b. These best keywords are the words of the word sequence 335b that have the greatest significance, or discriminating ability, according to some metric.

The methodology used by the keyword extractor 523 will be further discussed in a later section. As will be seen, the keyword extractor 523 uses a pre-stored list 539 of known filler words (i.e., words of extremely low discriminating ability, such as the word (for example, in Chinese) "I want to find" or the word (for example, in Chinese) "tell me the"). Preferably, the list of filler words is drawn from the queries of the query database 511. There are various ways of automatically obtaining a list of filler words. For example, the pre-stored list 539 of known filler words may be obtained from the query database 511 as described in CHEUNG Chi Shun, and Pascale FUNG, "Keyword/Fillerword Modeling for Spontaneous Spoken Mixed Language Query Processing", Proceedings 5th Natural Language Processing Pacific Rim Symposium 1999, Beijing, China, November 1999, pp. 467–470 [CHEUNG 1999].

2. The Keyword Expander

The keyword expander 527 accepts the keywords 535 (for example, the best N=four keywords) and expands the keywords 535 into an expanded set 539 of keywords. Preferably, the expanded set 539 of keywords includes about fifty percent more keywords than the original set 535 of keywords (for example, to six keywords from four). The keywords added to form the expanded set 539 of keywords may be words not found in the original word-sequence user query 335b. In the preferred embodiment of the invention, the keyword expander 527 makes use of a thesaurus 543, as will be further discussed in a later section. The thesaurus 543 is preferably embodied as the "thesaurus lexicon" that is further discussed in GUAN ET AL. 2000. As is further discussed in GUAN ET AL. 2000, the preferred thesaurus 543 is automatically generated from the query database 511, and is preferably configured in a fast-to-access data structure. The preferred thesaurus 543 is, in fact, also used within, and may be considered to be a part of, the preferred sentence-similarity matcher 505.

3. The Keyword Search Interface

The keyword search interface 531 accepts a set of keywords, namely the expanded set 539 of keywords, and uses them to retrieve indicators 543 (e.g., integer query identifiers) of the subset of the pre-stored queries of the query database 511. The keyword search interface 531 is a straightforward interface. Each query in the query database 511 is associated with keywords using which the query (or its indicator) can be retrieved. The keywords for each query are manually assigned to the query by system developers, who use their intuition and experience to answer the following question that they pose to themselves: "if I were to use a keyword to try to find this query, what would be the top R words of this query that I should use?" Preferably, the system parameter R equals four (or about four) and is a smaller number than the number of words in a typical database query.

V. Further Discussion of Methodology

A. Overview

Figure 6:
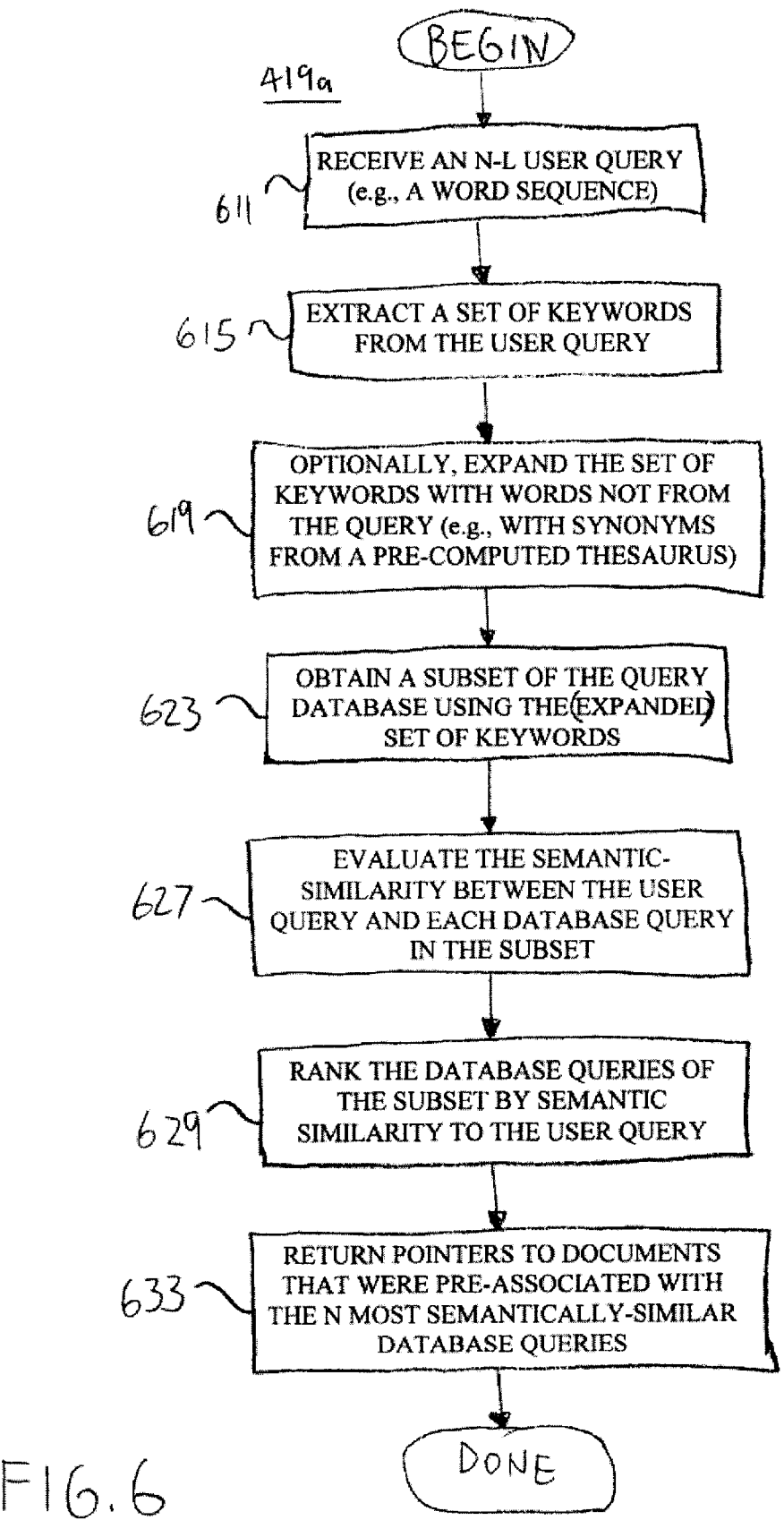
FIG. 6 is a flowchart that shows a method, according to the present invention, for retrieving documents in response to a natural-language query that includes Chinese words.

FIG. 6 is a flowchart that shows a method 419a, according to the present invention, for retrieving documents in response to a natural-language query that includes Chinese words. The method 419a is suitable for embodying the step 419 of the method 401 of FIG. 4. The method 419a is preferably executed by the WIDF 333a of FIG. 5.

As shown in FIG. 6, in a step 611, the WIDF 333a of FIG. 5 receives an N-L user query, in the form of a set of words (for example, a sequence of words). Next, in a step 615, the WIDF 333a extracts a set of N keywords (for example, N=four) from among the words of the user query. Next, in a preferred, optional step 619, the WIDF 33a expands the keywords with additional keywords that typically are not found in the user query to form an expanded set of N+S keywords (for example, N+S=six). Next, in a step 623, the WIDF 333a obtains a subset of the query database using the (expanded) set of keywords as keys for searching the query database. The database queries of the subset of the query database are the only database queries to be further considered for the user query. Next, in steps 627 and 629 together, the WIDF 333a obtains the K database queries (for example, K=ten), of the subset of the query database, that are most semantically similar to the user query. Finally, in the step 633, the WIDF 333a identifies, to the user, documents associated with the K database queries, perhaps subject to further interactive guidance from the user. The system parameters N, S, and K may be set to any value desired by the system builder. In particular: N may be set to four (preferred) or so; N+S may be set to about 1.5 times the value of N or so, for example, six (preferred) or so; and K may be set to ten (preferred) or so.

B. Extraction of Keywords

Extraction of keywords in the step 611 of FIG. 6 is preferably as follows. First, the keyword extractor 523 of FIG. 5 eliminates from further consideration all words of the user query that are filler words, according to the list 539 of filler words of FIG. 5. If the number of remaining non-filler words is no greater than the system parameter N for the number of keywords to generate, then the keyword extractor 523 chooses the remaining candidate words as the keywords. If more than N non-filler words exist, then the keyword extractor 523 looks up a metric of the significance, or discriminating ability, of each non-filler word of the user query. Based on these metrics, the keyword extractor 523 chooses, as keywords, the N words, of the non-filler words, that have highest discriminating ability. Preferably, the metric for significance is Inverse Document Frequency, or IDF, which is given by the following equation:

$$\text{IDF}(w) = \log(M/m) \qquad \text{(equation 1)}$$

In the above equation, M is the total number of queries in the query database; and m is the number of sentences in the query database that contain the word w. Thus, the more rare a word w is in the query database, the greater is its discriminating power, and the higher is its IDF(w) score. IDF is further discussed, for example, in GUAN ET AL. 2000.

C. Optional Expansion of Keywords with Words (Synonyms) Not in the User Query The optional step 619 of FIG. 6 is preferably used. Expansion of the set of keywords in the step 619 is preferably as follows. The keyword expander 527 of FIG. 5 considers the initial set of N keywords, one at a time, in order of decreasing significance. For each keyword considered, the keyword expander 527 adds the keyword's best synonym, if any, as determined by the thesaurus 543 of FIG. 5. The keyword expander 527 stops adding synonyms when S additional keywords have been added or when all N existing keywords have been considered. Alternatively, the keyword expander 527 may stop adding synonyms when a total of N+S keywords exist or when all N existing keywords have been considered. Typically, the number of keywords N+S is less than the number of words of a typical user query. As is fuirther discussed in GUAN ET AL. 2000, the thesaurus 543 includes, for each word, any semanticallysimilar words (above some minimal similarity threshold) and a semantic similarity score for each pair of such semantically-similar words.

D. Using Keywords to Identify a Subset of the Query Database

Retrieving database queries using the (expanded set of) keywords, in the step 623 of FIG. 6, is straightforward. As has been mentioned, the query database 511 associates, for each of its queries, a set of R keywords. These associations are organized into an index table so that, given a keyword, the keyword search interface 531 of FIG. 5 can search the index table and return all queries (for example, in the form of their query identifiers) that are associated with the given keyword.

E. Evaluating Semantic Similarity Between the User Query and Database Queries Evaluating semantic similarity between the user query and each database query of the subset, and then ranking the semantic similarities, is performed by the sentence-similarity matcher 505 of FIG. 5. The methodology underlying the sentence-similarity matcher 505 is further discussed in GUAN ET AL. 2000. Note again that, in contrast to the pre-screening process, which typically uses only a subset of the words of the user query, the sentence-similarity matcher 505 matches entire queries, with possible contribution to the match from each and every word of the user query.

F. Adapting the Methodology to Handle Word Classes

In the preferred embodiment of the present invention, there is preferably special handling for word classes that may be helpful to users. A word class is a class to which multiple words of the system vocabulary may belong. An example of a word class is "<singer>". Many words within the vocabulary, including the proper nouns, "Coco Lee" and "Leon Lai" (both are popular singers) belong to the word class "<singer>". Other word classes include, for example, "<airline>" and "<cityname>". Frequently, the members of a word class are instances of the general category that is represented by the word class.

The purpose of a word class is to artificially treat certain words as being highly similar (or even identical) to one another during portions of the method 419a of FIG. 6. In particular, suppose that the system builder (a person) believes that certain words, such as "Leon Lai" or "Coco Lee" (both are popular singers) are highly similar to each other, for the purpose of document retrieval. More specifically, the system builder may expect that users, when looking for documents using a query such as "tell me about Leon Lai", will also be interested in having the option of being quickly directed to documents that respond to queries that involve other singers.

In handling word classes, the lexicon is made to include each word class as a distinct word. For example, the word class "<singer>" is added as a word, which is a different word from the actual word "singer". The method 419a of FIG. 6 handles word classes in a straightforward manner. In the steps 615, 619, 623, 627, and 629, the user query and the database queries are treated as if each word that belongs to a word class had been replaced with by the name of the word class. For example, the database queries "what is the latest song of Leon Lai" and "what is the latest song of Coco Lee" are both treated as if they were instantiations a of the query template "what is the latest song of <singer>", and in fact these two queries are counted as a single query—i.e., as their template. In the above manner, a user query of "tell me about the CDs of Coco Lee" is likely to be matched to a database query of "what is the latest song of <singer>".

G. Communicating the Result to the User

After the most similar database queries have been found for the user query, the document finder presents the results to the user, preferably in a "search result" page (e.g., an HTML page that is served over the Internet), in the step 633. In general, the result is presented by displaying the database query, followed by hyperlinks to the document(s) associated with the database query. However, if the database query includes a word class, the word class name is not displayed, but rather a selection list of all available instantiations of that word class name in the query is displayed. The default selection that is shown is preferably the word that was actually a part of the user query, if such a word can instantiate the word class name in the query database.

For example, consider the following example. The user query is "tell me about the capital of Greece". The query database includes the query template "what is the capital of <countryname>", which can be instantiated only with "Greece", "China", "United States", "<countryname>" in the query database. (The word class name can instantiate itself if the query template itself has an entry that is associated with documents that pertain to the word class as a whole.) Then, if the database query "what is the capital of <countryname>" is one of the K most similar database queries to the user query, then in the step 633, the search result page will include the text "What is the capital of Greece", where the word Greece is the default choice that shows on a selection list. If the user clicks his mouse pointer on the word Greece, then the selection list pops up and the user is presented with other choices (China, United States, "countries, in general"). The user may select these other choices to bring up hyperlinks to the documents that relate to the database queries that so instantiate the query template.

VII. Further Comments

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In an information processing system, a method for identifying documents relevant to a natural-language user query, the method comprising the steps of:

selecting a set of keywords from the user query;

determining at least one word, not necessarily found in the user query, that is semantically similar to a keyword of the set of keywords;

using the set of keywords and the at least one word to determining a subset of word sets from a database of pre-stored word sets, wherein the pre-stored word sets are each pre-associated with at least one document;

determining a plurality of word sets, from the subset of word sets, that is most semantically similar to the user query; and identifying documents that have been pre-associated with the plurality of word sets as being relevant to the natural-language user query.

2. A system for identifying documents relevant to a natural-language user query, the system comprising:

means for selecting a set of keywords from the user query;

means for determining at least one word, not necessarily found in the user query, that is semantically similar to a keyword of the set of keywords;

means for using the set of keywords and the at least one word to determining a subset of word sets from a database of pre-stored word sets, wherein the pre-stored word sets are each pre-associated with at least one document;

means for determining a plurality of word sets, from the subset of word sets, that is most semantically similar to the user query; and means for identifying documents that have been pre-associated with the plurality of word sets as being relevant to the natural-language user query.

\* \* \* \* \*